United States Patent
Van et al.

(10) Patent No.: US 12,417,163 B2
(45) Date of Patent: Sep. 16, 2025

(54) SELECTABLE GRANULARITY PERFORMANCE MONITOR

(71) Applicant: SiFive, Inc., San Mateo, CA (US)

(72) Inventors: Richard Van, San Jose, CA (US); Huang Chao Wei, Zhubei (TW)

(73) Assignee: SiFive, Inc., Santa Clara, CA (US)

( * ) Notice: Subject to any disclaimer, the term of this patent is extended or adjusted under 35 U.S.C. 154(b) by 116 days.

(21) Appl. No.: 18/476,933

(22) Filed: Sep. 28, 2023

(65) Prior Publication Data
US 2024/0184684 A1 Jun. 6, 2024

Related U.S. Application Data

(60) Provisional application No. 63/429,974, filed on Dec. 2, 2022.

(51) Int. Cl.
*G06F 11/34* (2006.01)
(52) U.S. Cl.
CPC .................................. *G06F 11/348* (2013.01)

(58) Field of Classification Search
None
See application file for complete search history.

(56) References Cited

U.S. PATENT DOCUMENTS

2019/0260824 A1\* 8/2019 Pitio ....................... H04L 67/10

\* cited by examiner

*Primary Examiner* — Scott C Sun
(74) *Attorney, Agent, or Firm* — Kilpatrick Townsend & Stockton LLP

(57) ABSTRACT

Systems and methods are described to collect latency data of transactions traversing a processor using a performance monitor, which uses a bucket timer based on a granule value in a configurable granule counter. The monitor can determine a transaction time for a transaction, which can then be compared to enumerated buckets (where the bucket size is based on the granule value), determine the appropriate bucket, and increment a latency counter associated with the bucket. The monitor can include a saturation mechanism to account for overflow or saturation. The collected data can be read by an external device to generate a histogram to identify potential problems in the processor or processor pipeline.

20 Claims, 8 Drawing Sheets

SELECTABLE GRANULARITY PERFORMANCE MONITOR

CROSS REFERENCE TO RELATED APPLICATION

This application claims priority to and the benefit of U.S. Provisional Patent Application Ser. No. 63/429,974 filed on Dec. 2, 2022, the entire disclosure of which is hereby incorporated by reference.

TECHNICAL FIELD

This disclosure relates generally to integrated circuits and, more specifically, device performance monitoring and analysis.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

A processor or processor core may execute instructions in a pipeline based on the microarchitecture that is implemented. The pipeline may be implemented by various components, such as decode units, rename units, dispatch units, execution units, registers, caches, queues, data paths, and/or other logic associated with instruction flow. Performance monitors are used to collect data to analyze performance of a design, debug, and other related activities. However, given the premiums for chip area, power usage, and other factors, low impact and low footprint performance monitors are needed.

Described are methods and circuitry to collect data from the processor using a minimal footprint performance monitor based on a granule counter which is configurable via a configuration status register or a control and status register. In implementations, the performance monitor can record the latency attributed to transactions, operations, instructions, requests, and the like (collectively "transactions") as they pass through a processor pipeline from issue to retirement. In implementations, the performance monitor can record the latency (or transaction time) attributed to the transactions as they pass through certain portions or stages of the processor pipeline. In implementations, the performance monitor can record other performance attributes associated with the transactions. The collected data can be read by an external device to generate a histogram to identify potential problems in the processor or processor pipeline. The configurable granule counter can be used to control a bucket timer and bucket sizes. That is, the granule counter can control how often a bucket timer is increased. This can reduce the number of counters and registers needed in the processor. The configurable granule counter can also be used to conduct targeted or directed data collection based on problems observed from a previous data analysis. That is, the bucket size or resolution of the bucket timer can be adjusted to capture additional data based on the previous data analysis.

In implementations, the performance monitor can allocate an entry for each active transaction along with a start time. Upon retirement or equivalent termination, the performance monitor can deallocate the entry for the transaction. The amount of time can then be compared to enumerated buckets (where the bucket size is based on the value of the configurable granule counter), determine the appropriate bucket, and increment a latency counter associated with the bucket. The performance monitor can include a saturation mechanism to account for overflow or saturation. The saturation mechanism can include the use of a saturation bit for each entry. The saturation mechanism can include a saturation or overflow counter when the amount of time is greater than a maximum enumerated time.

Figure 1:
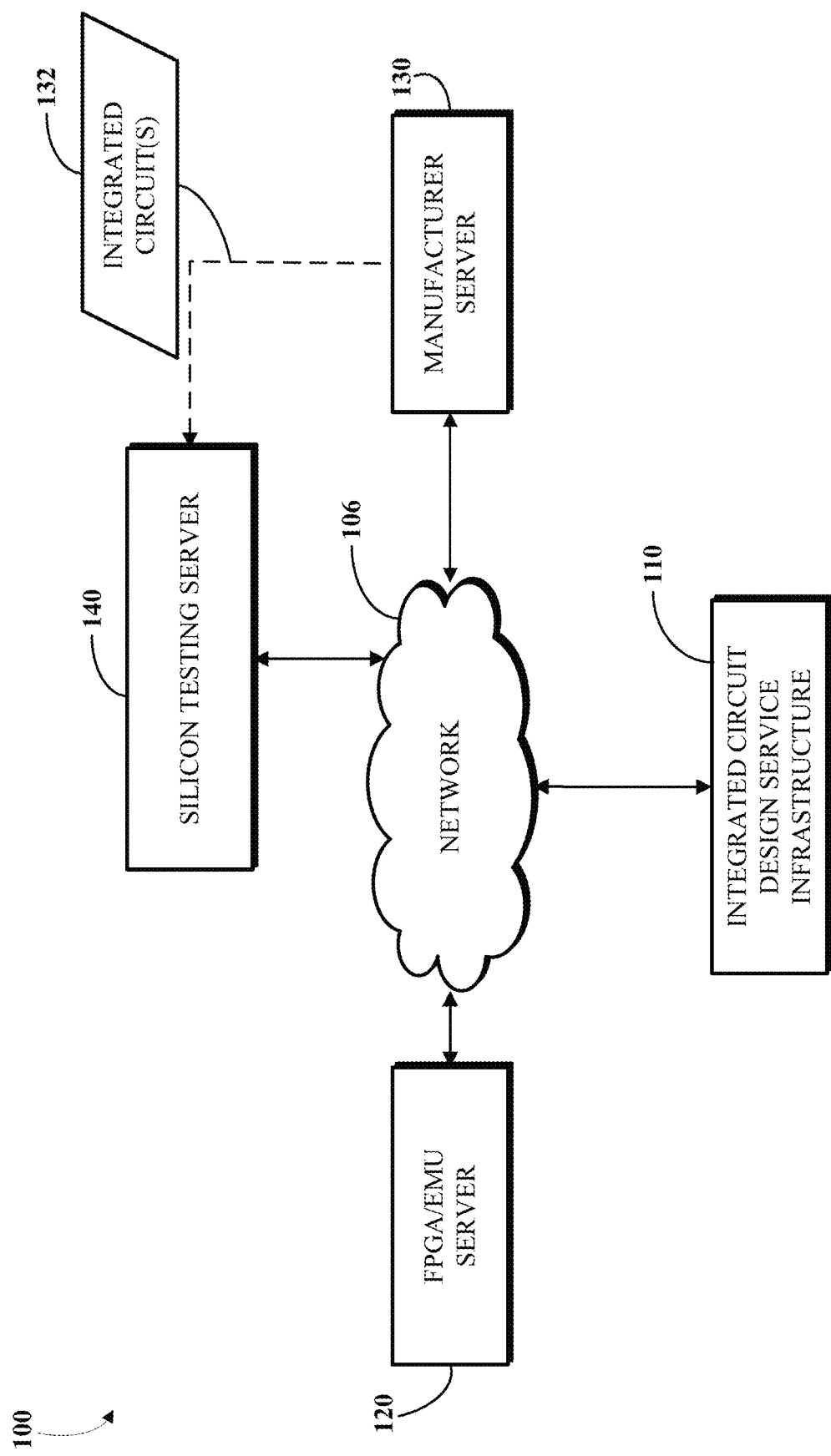
FIG. 1 is a block diagram of an example of a system for facilitating generation and manufacture of integrated circuits.

To describe some implementations in greater detail, reference is first made to examples of hardware and software structures used to implement a system including components that may provide a selectable granularity performance monitor. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5C.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
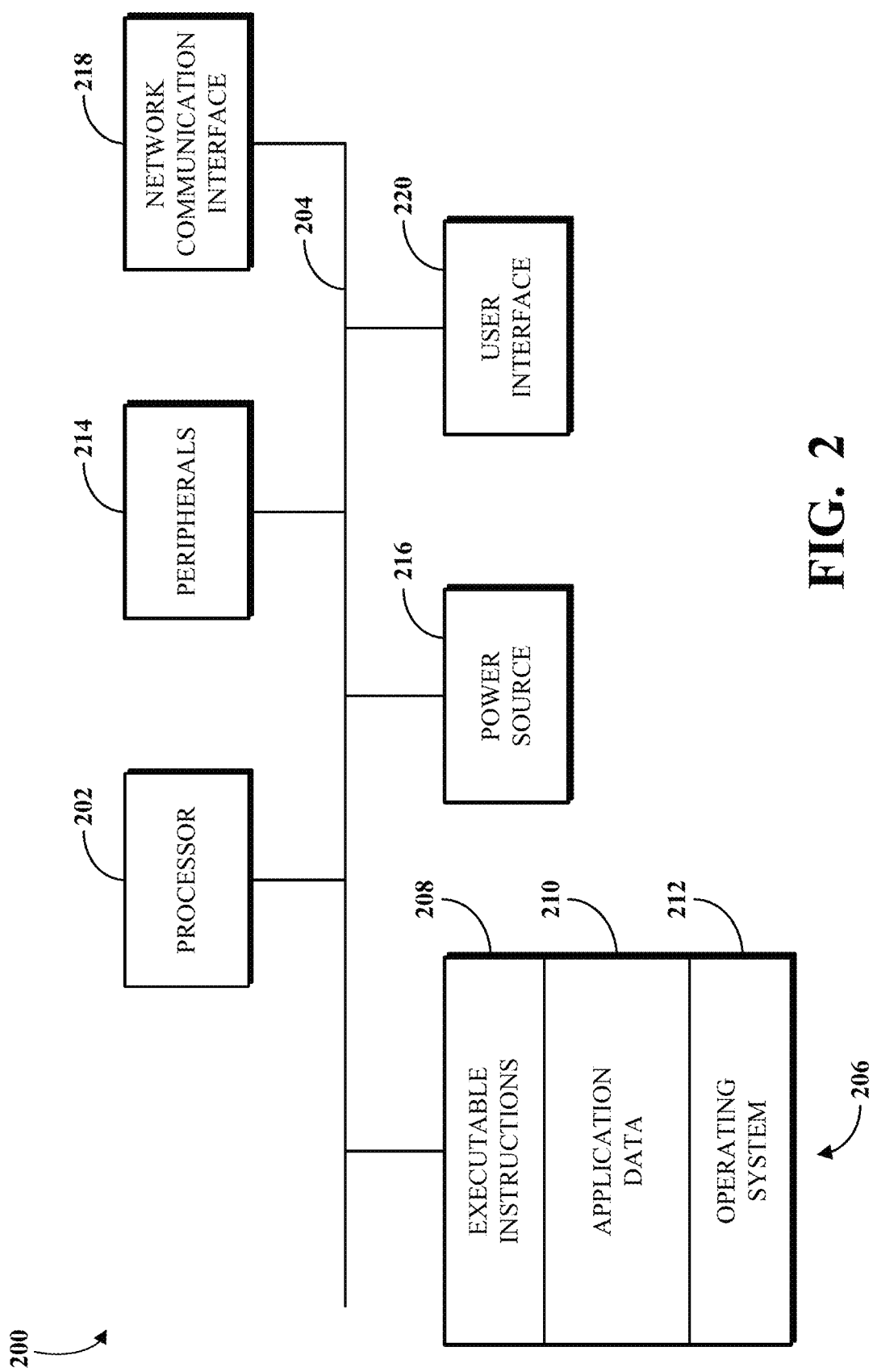
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5C.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
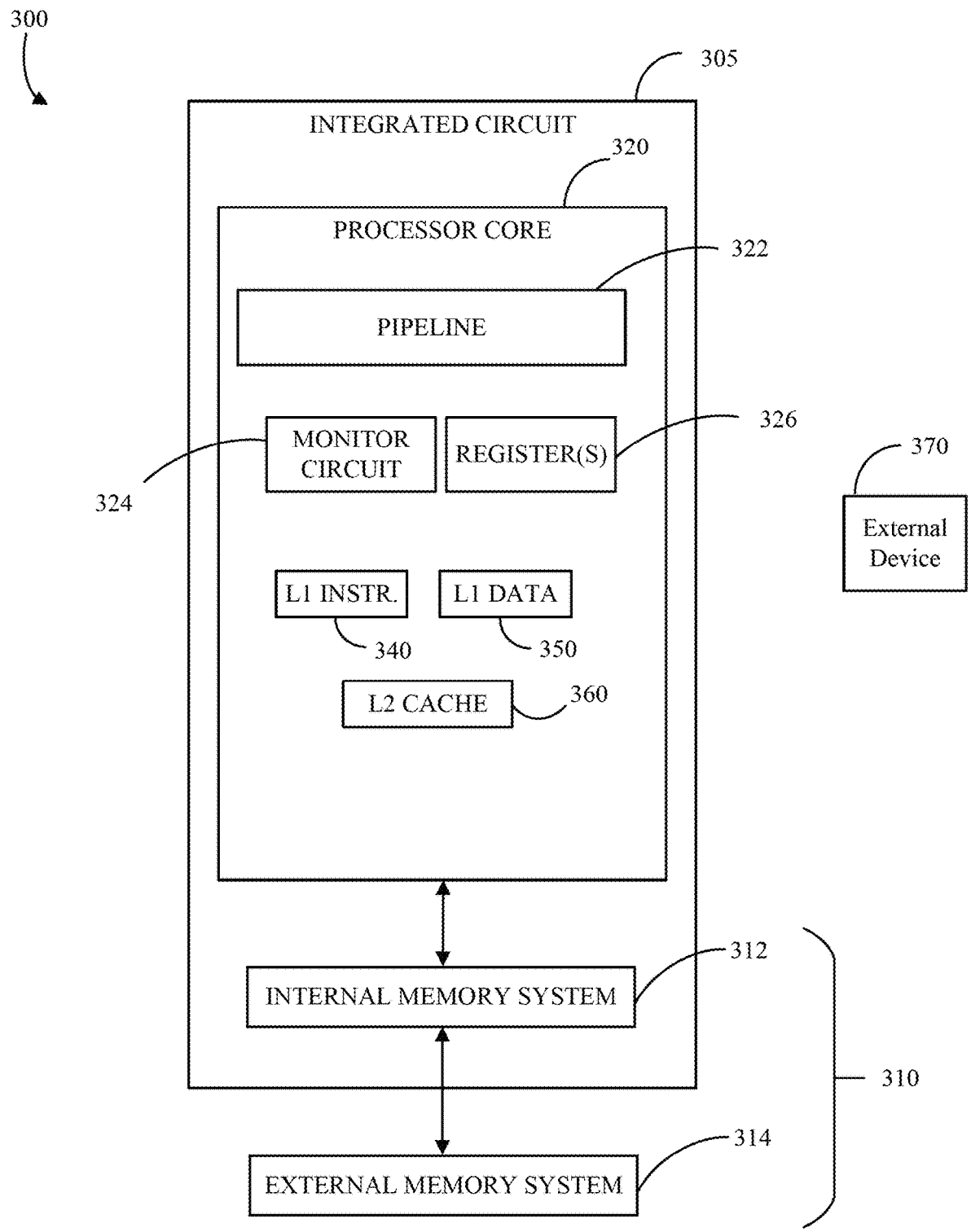
FIG. 3 is a block diagram of an example of an integrated circuit with a performance monitor.

FIG. 3 is a block diagram of an example of a system 300 including an integrated circuit 305 and a memory system 310. The integrated circuit 305 may include a processor core 320. The integrated circuit 305 could be implemented, for example, as a field-programmable gate array (FPGA), an application-specific integrated circuit (ASIC), or a system-on-chip (SoC). The memory system 310 may include an internal memory system 312 and an external memory system 314. The internal memory system 312 may be in communication with the external memory system 314. The internal memory system 312 may be internal to the integrated circuit 305 (e.g., implemented by the FPGA, the ASIC, or the SoC). The external memory system 314 may be external to integrated circuit 305 (e.g., not implemented by the FPGA, the ASIC, or the SoC). The internal memory system 312 may include, for example, a controller and memory, such as random access memory (RAM), static random access memory (SRAM), cache, and/or a cache controller, such as a level three (L3) cache and an L3 cache controller. The external memory system 314 may include, for example, a controller and memory, such as dynamic random access memory (DRAM) and a memory controller. In some implementations, the memory system 310 may include memory mapped inputs and outputs (MMIO), and may be connected to non-volatile memory, such as a disk drive, a solid-state drive, flash memory, and/or phase-change memory (PCM).

The processor core 320 may include circuitry for executing instructions, such as one or more pipelines 322, a monitor circuit 324, one or more registers 326, a level one (L1) instruction cache 340, an L1 data cache 350, and a level two (L2) cache 360 that may be a shared cache. The processor core 320 may fetch and execute instructions in the one or more pipelines 322, for example, as part of a program sequence. The instructions may cause memory requests (e.g., read requests and/or write requests) that the one or more pipelines 330 may transmit to the L1 instruction cache 340, the L1 data cache 350, and/or the L2 cache 360.

Each of the one or more pipelines 330 may include a primary pipeline and a vector pipeline. The primary pipeline and the vector pipeline can each have separate decode units, rename units, dispatch units, execution units, physical and/or virtual registers, caches, queues, data paths, and/or other logic associated with instruction flow. In some implementations, the primary pipeline and the vector pipeline may be out-of-order pipelines.

The monitor circuit 324 and the one or more registers 326 can be used to configure a bucket timer and collect performance data as described herein. In implementations, the monitor circuit 324 can include a bucket timer, comparator, transaction table, and logic circuitry. In implementations, the one or more registers 326 can include a configuration status register or a control and status register (CSR) and latency registers. The configuration status register or a control and status register can be used to set a granule value in the bucket timer.

An external device 370 can be used to read the collected data from the latency registers to perform data analysis. The external device can be a processor, analysis and/or diagnostic equipment, and/or other devices to collect and analyze the data.

The system 300 and each component in the system 300 is illustrative and can include additional, fewer, or different components which may be similarly or differently architected without departing from the scope of the specification and claims herein. Moreover, the illustrated components can perform other functions without departing from the scope of the specification and claims herein.

Figure 4:
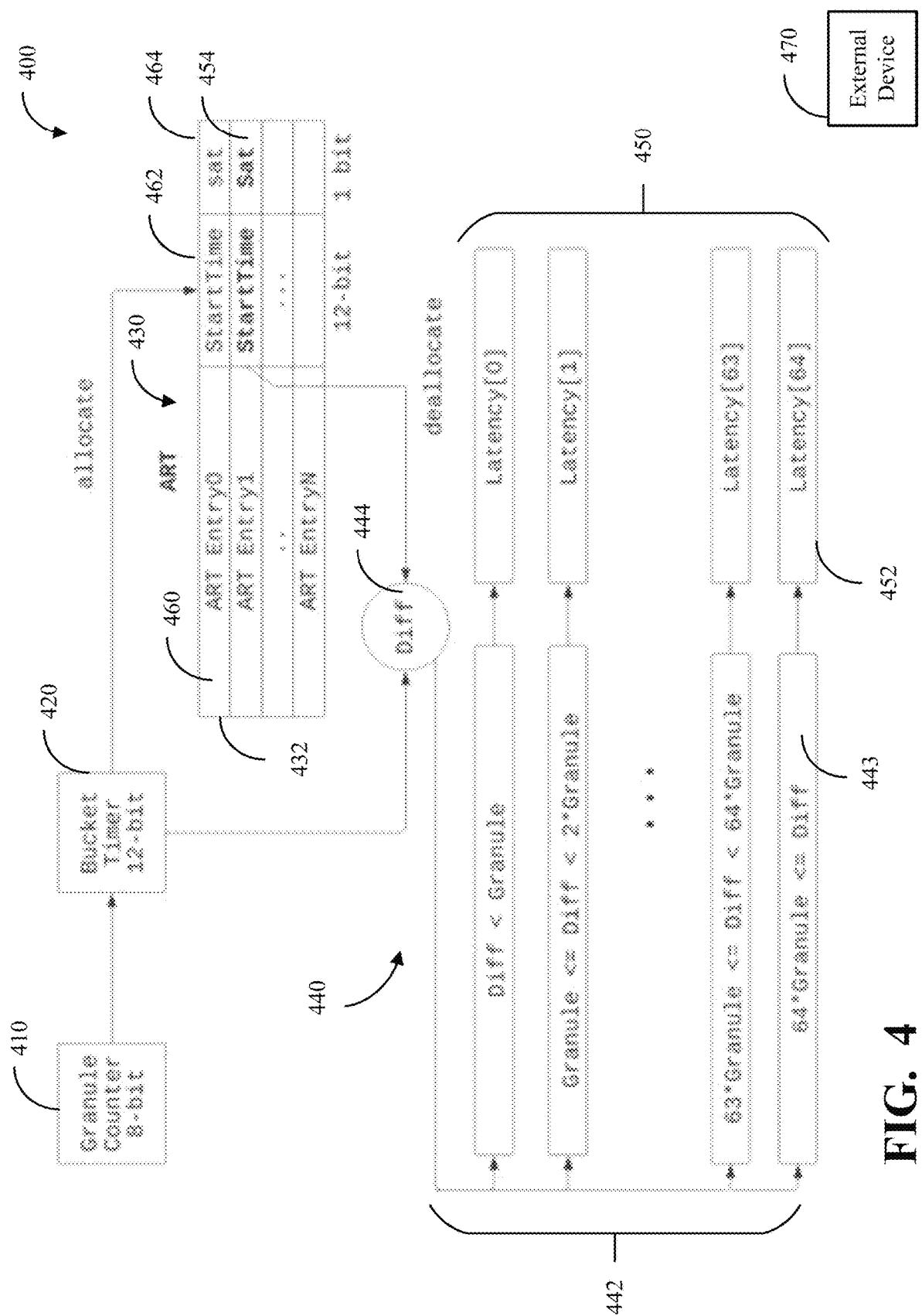
FIG. 4 is a block diagram of a performance monitor circuit.

FIG. 4 is a block diagram of a performance monitor circuit 400. The performance monitor circuit 400 can include a granule circuit 410, a bucket timer 420, an active request or transaction table (ART) 430, a bucket determination circuit 440, and latency counters 450. In implementations, the ART 430 can include one or more entries 432. In implementations, each entry 432 can include a transaction field 460, a start time field 462, and a saturation bit 464.

The granule circuit 410 can control the granularity or resolution at which the monitor circuit 400 can track or count transaction times. In implementations, the granule circuit 410 is a selectable and/or configurable counter that can be set to a granule value using a CSR. In implementations, the granule circuit 410 is an 8 bit counter. In implementations, the granule value controls how often the bucket timer 420 is increased. For example, if the granule value is set to 8, then the bucket timer 420 increments after each 8 cycles.

The bucket timer 420 is used to determine start and end times for a transaction. The resolution of the bucket timer 420 is controlled by the granule circuit 410. In implementations, the resolution of the bucket timer 420 can be changed in view of analyzed data.

The ART 430 can track a transaction using the transaction field 460 and a start time for the transaction using the start time field 462, which is set via the bucket timer 420. The saturation bit 464 can be used to track which entries have overflowed. In implementations, this can be used to identify which transaction and therefore which type of transaction. This information can be used to optimize processor performance.

The bucket determination circuit 440 includes one or more buckets 442 and a difference comparator or subtractor 444. In implementations, a bucket size of certain of the one or more buckets 442 is the granule value. In implementations, transaction times (denoted as "Diff" in FIG. 4) less than a granule value are captured in one bucket, and transaction times greater than the granule value times the number of latency counters are captured in one bucket, i.e., overflow transaction times.

The number of latency counters 450 is configured at circuit design or build. In implementations, the latency counters 450 can include an overflow or saturation counter 452. The overflow or saturation counter 452 corresponds to the bucket where the transaction times are greater than the granule value times the number of latency counters.

Figure 5A:
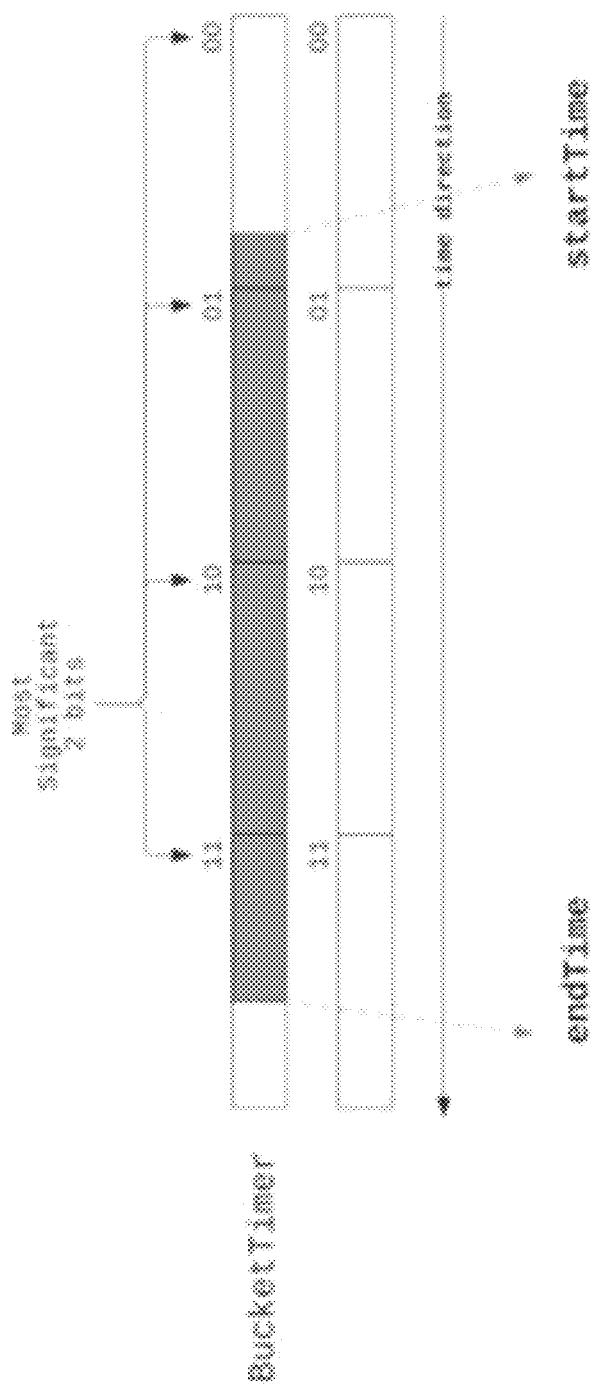
FIG. 5A, FIG. 5B, and FIG. 5C are illustrations of saturation correction.
Figure 5B:
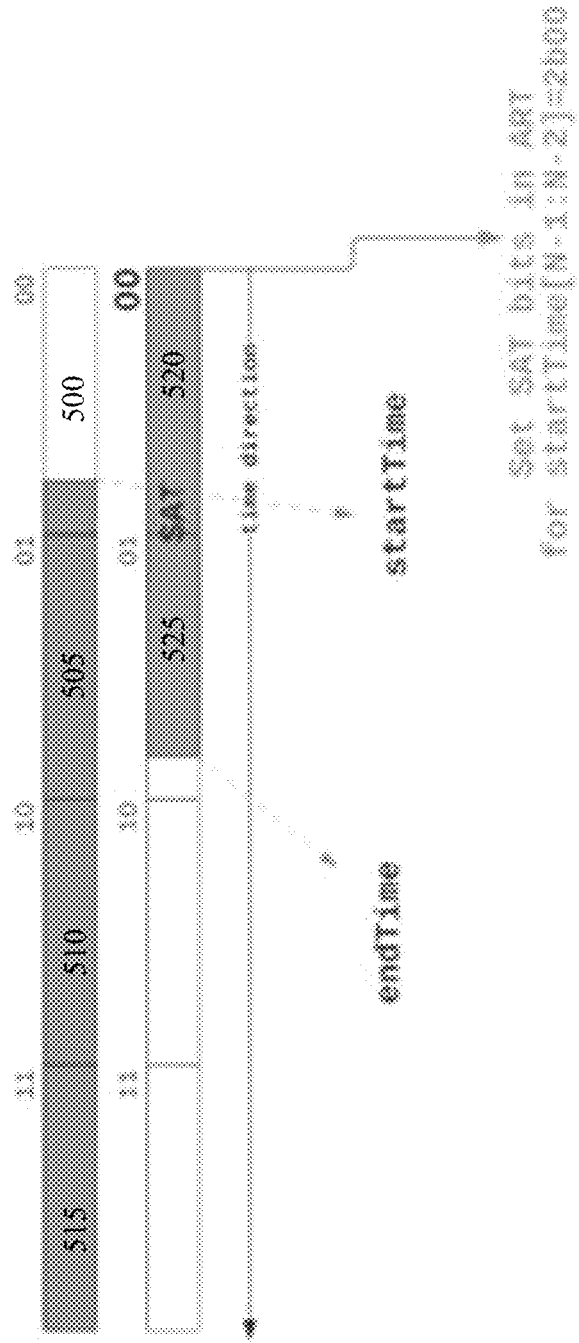
Figure 5C:
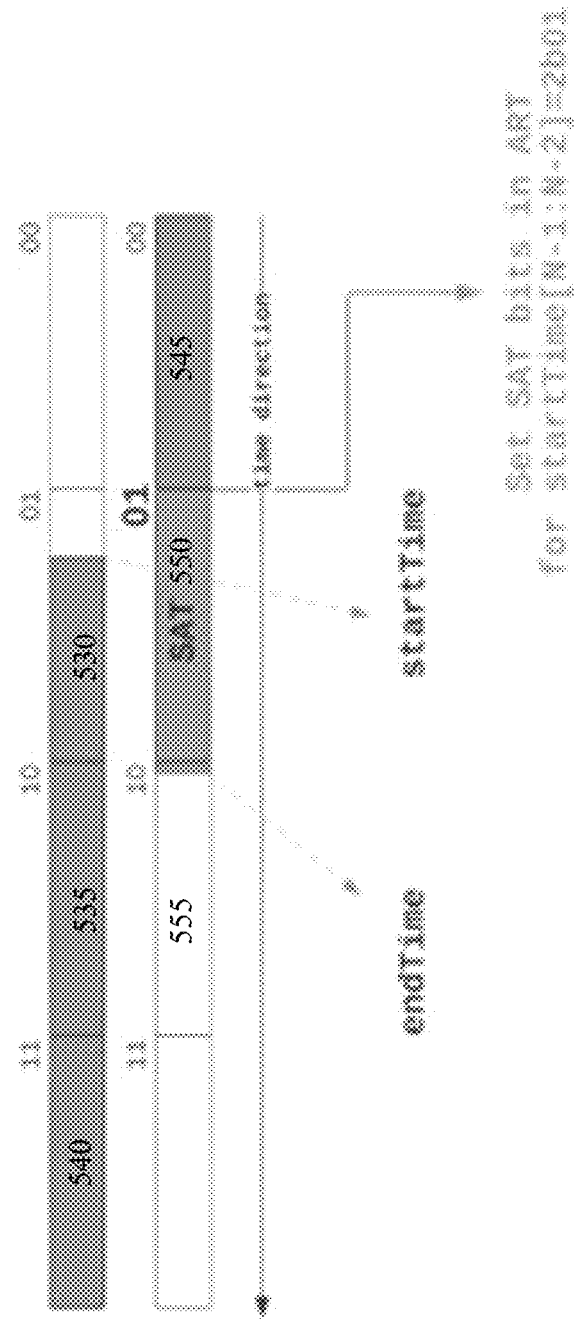

As noted, the performance monitor circuit 400 can account for overflow and/or saturation issues. FIGS. 5A, 5B, and 5C illustrate the concept of this saturation mechanism. The saturation mechanism is implemented in the performance monitor circuit 400 because the bucket timer 420 bits are limited. In implementations, the maximum cycles for a non-saturation case would be $(3*2^{(N-1)})$, where N is the bit width of the bucket timer.

In implementations, the length of time covered by the bucket timer 420 can be segmented into multiple segments or time zones. A defined number of most significant bits (MSB(s)) define or indicate a segment. For example, in FIG. 5A, the bucket timer 420 is divided into 4 time zones according to its most significant two bits. The performance monitor circuit 400 and/or the bucket timer 420 can send out signals to indicate that defined number of MSBs have flipped from one state to another state. For example, the performance monitor circuit 400 and/or the bucket timer 420 can send out signals to indicate that the two MSBs have flipped from one to another, for example, 0x3ff to 0x400 or 0x7FF to 0x800. In the event of an overflow or saturation, a saturation bit 464 in an entry 432 in the ART 430 can be set to indicate the overflow or saturation event. For example, the saturation bits 464 can be set for requests which have MSBs as 0x00 when the bucket timer 420 flips from 0xFFF to 0x000, can set the saturation bits 464 for requests which have the MSBs as 0x01 when the bucket timer 420 flips from 0x3ff to 0x400, and so on. Therefore, there won't be a problem case if the bucket timer 420 wraps around and exceeds the start time recorded in the start time field 462 in the ART 430 and causes a wrong transaction time or duration calculation.

FIGS. 5B and 5C illustrate the saturation or overflow mechanism as described. As shown in FIG. 5B, a start time for a transaction is in a first segment 500. The first segment 500 is defined by MSBs 00. As the transaction progresses through the processor or processor pipeline, the bucket timer progresses through segments 505, 510, 515, wraps around in 520, and completes in segment 525. The bucket timer sends a signal and a saturation bit is set when the bucket timer wraps around to the segment 520. Similarly, in FIG. 5C, as the transaction (which starts in segment 530) progresses through the processor or processor pipeline, the bucket timer progresses through segments 535, 540, 545, wraps around in 550, and completes in segment 555. The bucket timer sends a signal and a saturation bit is set when the bucket timer wraps around to the segment 550.

Operationally, a transaction entering a processor pipeline can be allocated an entry 432 in the ART 430. The start time field 462 is populated via the bucket timer 420. When a transaction in the ART 430 retires, the associated entry 432 can be deallocated and the bucket timer 420 can send a retirement time to the difference comparator or subtractor 444 to determine a time difference or transaction time. The bucket determination circuit 440 can determine which bucket of the buckets 442 is applicable and an associated one of the latency counters 450 can be incremented. At some point, an external device 470 (external device to the integrated circuit) can read the results from the latency counters 450. The results can be used to construct a histogram. The histogram can be used to analyze minimum, maximum, average, and outlier numbers.

Figure 6:
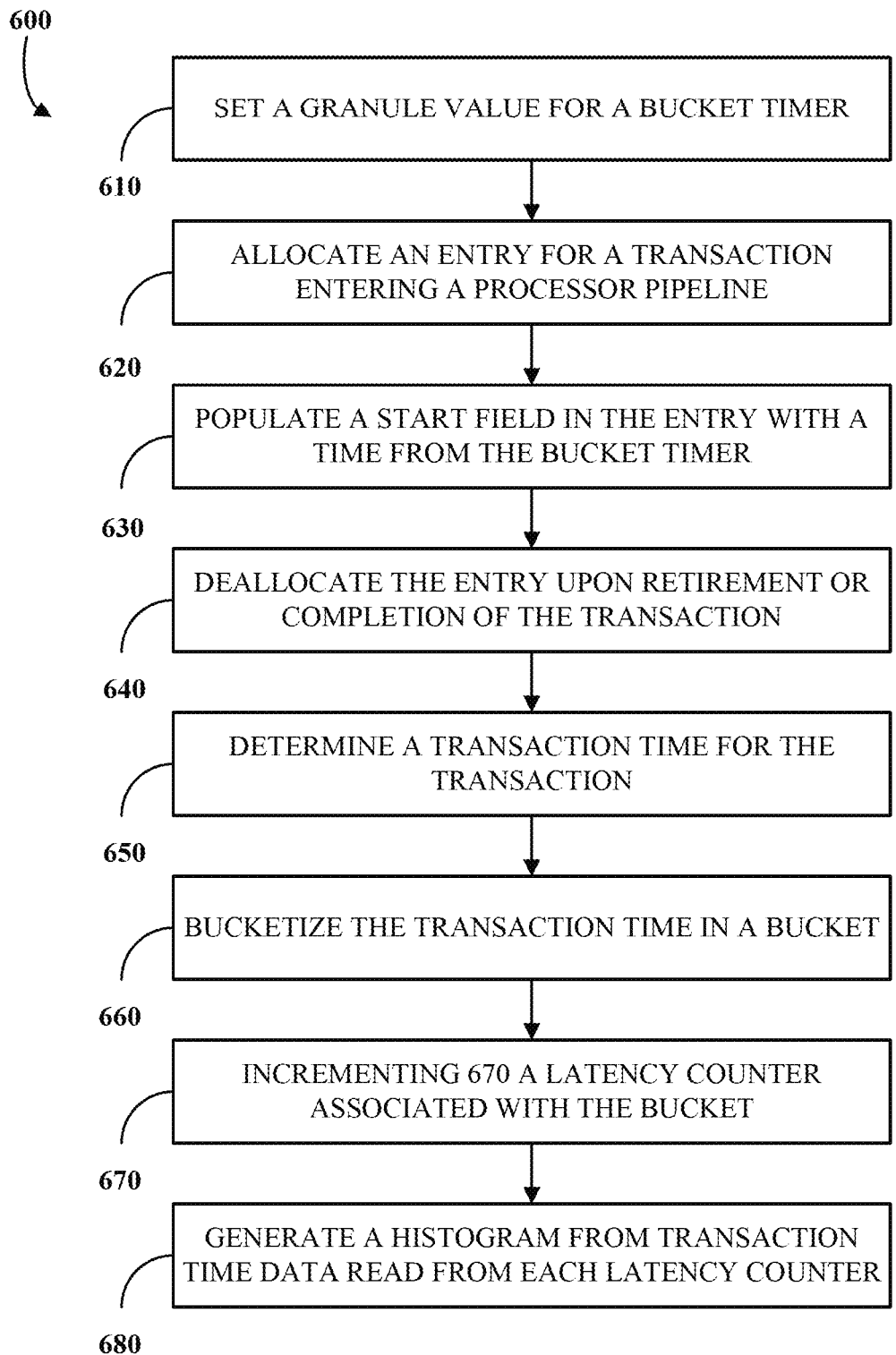
FIG. 6 is an example of a flowchart for collection of transaction time data in a processor.

FIG. 6 is a block diagram of an example of a method or technique 600 for collection of transaction time data in a processor. The technique 600 includes: setting 610 a granule value for a bucket timer; allocating 620 an entry for a transaction entering a processor pipeline; populating 630 a start field in the entry with a time from the bucket timer; deallocating 640 the entry upon retirement or completion of the transaction; determining 650 a transaction time for the transaction; bucketizing 660 the transaction time in a bucket; incrementing 670 a latency counter associated with the bucket; and generating 680 a histogram from transaction time data read from each latency counter. The technique 600 can be implemented, for example, in the system 100 and the system 200 to build the system 300, and the performance monitor circuit 400, as appropriate and applicable.

The technique includes setting 610 a granule value for a bucket timer in a performance monitor. In implementations, the number of latency counters (registers) in a performance monitor can be selected at design or build time. The automated integrated circuit build system can output an integrated circuit design or SoC based on the number of latency counters and including the performance monitor circuit as described herein. A granule counter controls a resolution of a bucket timer and a bucket size of some of the latency counters That is, the bucket size corresponds to the range of transaction times that can fit in a particular bucket. A granule value in the granule counter can be set via a CSR, which in turn can be set via a user interface.

The technique includes allocating 620 an entry for a transaction entering a processor pipeline populating 630 a start field in the entry with a time from the bucket timer. An entry in an active request or transaction table is allocated when a transaction enters or starts in a processor pipeline. A start time field in the active request or transaction table is set with a start time from the bucket timer.

The technique includes deallocating 640 the entry upon retirement or completion of the transaction and determining 650 a transaction time for the transaction. Completion or retirement of the transaction triggers deallocation of the entry in the active request or transaction table and computation of the transaction time. A comparator can determine the transaction time using a completion or retirement time from the bucket timer and the start time in the start field. During the progression through the processor pipeline, the performance monitor or bucket timer can determine if an overflow or saturation event occurs for an entry. A saturation bit can be set in such a case.

The technique includes bucketizing 660 the transaction time in a bucket and incrementing 670 a latency counter associated with the bucket. A determination is made as to which bucket the determined transaction time falls into and a latency counter is incremented accordingly. An overflow or saturation bucket and associated counter can be provided to accommodate transactions greater than a value of the granule value multiplied by the number of latency counters.

The technique includes generating 680 a histogram from transaction time data read from each latency counter. The count in each of the latency counters can be accessed or obtained by an external device at a defined time, at defined intervals, on-demand, and/or combinations thereof. A histogram and/or other statistical measure or metric can be determined based on the collected data to measure processor performance, issues with the processor, avenues on how to optimize performance, and combinations thereof.

In implementations, a method includes allocating, by a monitor circuit in an integrated circuit, an entry in an active transaction table for a transaction entering a pipeline in a processor in the integrated circuit, populating, by a bucket timer in the monitor circuit, a start field in the entry with a start time from the bucket timer for the transaction, determining, by the monitor circuit, a transaction time for the transaction based on the start time and a completion time from the bucket timer, placing, by the monitor circuit, the transaction time in a bucket selected from multiple buckets, incrementing, by the monitor circuit, a latency counter associated with the bucket, and generating a histogram from transaction time data read from multiple latency counters.

In implementations, the method further includes providing, by a granule counter, a granule value for the bucket timer, wherein the granule value controls how often the bucket timer is incremented. In implementations, the granule value determines a range of transaction times that can fit into a bucket of the multiple buckets. In implementations, the method further includes configuring, via a control and status register, the granule value in the granule counter. In implementations, the method further includes deallocating, by the monitor circuit, the entry upon retirement or completion of the transaction in the pipeline of the processor. In implementations, the multiple latency counters includes a saturation counter for transaction times greater than a value of the granule value multiplied by a value representing number of multiple latency counters. In implementations, the method further includes setting, by the monitor circuit, a saturation bit in an entry for a transaction when the bucket timer overflows or saturates. In implementations, the method further includes segmenting the bucket timer into multiple segments, each segment defined by a number of most significant bits. In implementations, a state change of the most significant bits indicates a saturation event, and the method further includes sending, by the bucket timer to the monitor circuit, an indication of the state change.

In implementations, an integrated circuit includes at least one processor; and a monitoring circuit connected to the at least one processor. The monitoring circuit configured to allocate an entry in an active transaction table for a transaction entering a pipeline in the at least one processor, set a start field in the entry with a start time from a bucket timer for the transaction, determine a transaction time for the transaction based on the start time and a completion time from the bucket timer, select a bucket from multiple buckets for the transaction time, and increment a latency counter associated with the selected bucket, wherein transaction time data read from multiple latency counters is used to generate statistical metrics for the at least one processor.

In implementations, the monitoring circuit includes a granule counter, wherein the granule counter configured to provide a granule value for the bucket timer, and wherein the granule value controls how often the bucket timer is incremented. In implementations, the granule value determines a range of transaction times that can fit into a bucket of the multiple buckets. In implementations, the integrated circuit further includes a control and status register configured to set the granule value in the granule counter. In implementations, the monitoring circuit is further configured to deallocate the entry upon retirement or completion of the transaction in the pipeline of the at least one processor. In implementations, the multiple latency counters includes a saturation counter for transaction times greater than a value of the granule value multiplied by a value representing number of multiple latency counters. In implementations, the monitoring circuit is further configured to set a saturation bit in an entry for a transaction when the bucket timer overflows or saturates. In implementations, the bucket timer is segmented into multiple segments, each segment defined by a number of most significant bits. In implementations, a state change of the most significant bits indicates a saturation event and the bucket timer is configured to send an indication of the state change to the monitoring circuit.

In implementations, a monitoring circuit for a processor includes a bucket timer configured to provide a start time and a completion for each transaction that enters a processor pipeline, an active transaction table configured to allocate an entry for each transaction that enters the processor pipeline, each entry including at least a start time field for storing a start time, a bucket determination circuit with multiple buckets, the bucket determination circuit configured to determine a transaction time for a transaction based on a start time and a completion time from the bucket timer and select a bucket from the multiple buckets for the transaction time, and multiple latency counters, one latency counter for each of the multiple buckets, wherein a latency counter is incremented for a selected bucket.

In implementations, the monitoring circuit further includes a granule counter, wherein the granule counter is configured to provide a granule value for the bucket timer, and wherein the granule value controls how often the bucket timer is incremented and determines a range of transaction times that can fit into a bucket of the multiple buckets.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:
    allocating, by a monitor circuit in an integrated circuit, an entry in an active transaction table for a transaction entering a pipeline in a processor in the integrated circuit;
    populating, by a bucket timer in the monitor circuit, a start field in the entry with a start time from the bucket timer for the transaction;
    determining, by the monitor circuit, a transaction time for the transaction based on the start time and a completion time from the bucket timer;
    placing, by the monitor circuit, the transaction time in a bucket selected from multiple buckets;
    incrementing, by the monitor circuit, a latency counter associated with the bucket; and
    generating a histogram from transaction time data read from multiple latency counters.

2. The method of claim 1, further comprising:
    providing, by a granule counter, a granule value for the bucket timer, wherein the granule value controls how often the bucket timer is incremented.

3. The method of claim 2, wherein the granule value determines a range of transaction times that can fit into a bucket of the multiple buckets.

4. The method of claim 2, further comprising:
    configuring, via a control and status register, the granule value in the granule counter.

5. The method of claim 1, further comprising:
    deallocating, by the monitor circuit, the entry upon retirement or completion of the transaction in the pipeline of the processor.

6. The method of claim 1, wherein the multiple latency counters includes a saturation counter for transaction times greater than a value of a granule value multiplied by a value representing number of multiple latency counters.

7. The method of claim 1, further comprising:
    setting, by the monitor circuit, a saturation bit in an entry for a transaction when the bucket timer overflows or saturates.

8. The method of claim 7, further comprising:
    segmenting the bucket timer into multiple segments, each segment defined by a number of most significant bits.

9. The method of claim 8, wherein a state change of the most significant bits indicates a saturation event, the method further comprising:
    sending, by the bucket timer to the monitor circuit, an indication of the state change.

10. An integrated circuit comprising:
    at least one processor; and
    a monitoring circuit connected to the at least one processor, the monitoring circuit configured to:

allocate an entry in an active transaction table for a transaction entering a pipeline in the at least one processor;

set a start field in the entry with a start time from a bucket timer for the transaction;

determine a transaction time for the transaction based on the start time and a completion time from the bucket timer;

select a bucket from multiple buckets for the transaction time; and increment a latency counter associated with the selected bucket, wherein transaction time data read from multiple latency counters is used to generate statistical metrics for the at least one processor.

11. The integrated circuit of claim 10, wherein the monitoring circuit includes a granule counter, wherein the granule counter configured to provide a granule value for the bucket timer, and wherein the granule value controls how often the bucket timer is incremented.

12. The integrated circuit of claim 11, wherein the granule value determines a range of transaction times that can fit into a bucket of the multiple buckets.

13. The integrated circuit of claim 12, further comprising:
a control and status register configured to set the granule value in the granule counter.

14. The integrated circuit of claim 10, the monitoring circuit further configured to:
deallocate the entry upon retirement or completion of the transaction in the pipeline of the at least one processor.

15. The integrated circuit of claim 10, wherein the multiple latency counters includes a saturation counter for transaction times greater than a value of a granule value multiplied by a value representing number of multiple latency counters.

16. The integrated circuit of claim 10, the monitoring circuit further configured to:
set a saturation bit in an entry for a transaction when the bucket timer overflows or saturates.

17. The integrated circuit of claim 16, wherein the bucket timer is segmented into multiple segments, each segment defined by a number of most significant bits.

18. The integrated circuit of claim 17, wherein a state change of the most significant bits indicates a saturation event, the bucket timer configured to:
send an indication of the state change to the monitoring circuit.

19. A monitoring circuit for a processor, the monitoring circuit comprising:
a bucket timer configured to provide a start time and a completion for each transaction that enters a processor pipeline;

an active transaction table configured to allocate an entry for each transaction that enters the processor pipeline, each entry including at least a start time field for storing a start time;

a bucket determination circuit with multiple buckets, the bucket determination circuit configured to determine a transaction time for a transaction based on a start time and a completion time from the bucket timer and select a bucket from the multiple buckets for the transaction time; and multiple latency counters, one latency counter for each of the multiple buckets, wherein a latency counter is incremented for a selected bucket.

20. The monitoring circuit of claim 19, further comprising:
a granule counter, wherein the granule counter is configured to provide a granule value for the bucket timer, and wherein the granule value controls how often the bucket timer is incremented and determines a range of transaction times that can fit into a bucket of the multiple buckets.

* * * * *